(12) United States Patent
Vesikivi et al.

(10) Patent No.: US 7,126,481 B2
(45) Date of Patent: Oct. 24, 2006

(54) METHODS, SYSTEMS, DEVICES AND COMPUTER PROGRAM PRODUCTS FOR PROVIDING DYNAMIC PRODUCT INFORMATION IN SHORT-RANGE COMMUNICATION

(75) Inventors: Petri Vesikivi, Espoo (FI); Sebastian Nyström, Espoo (FI); Mikko Saarisalo, Kantvik (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 10/951,141

(22) Filed: Sep. 27, 2004

(65) Prior Publication Data

US 2006/0071778 A1    Apr. 6, 2006

(51) Int. Cl.
G08B 13/14    (2006.01)

(52) U.S. Cl. .............................. 340/572.4; 340/539.11; 340/505; 340/10.1

(58) Field of Classification Search ............ 340/572.1, 340/572.4, 568.1, 539.11, 539.16, 539.17, 340/286.01, 286.04, 10.01, 10.41, 505; 455/41.1, 455/41.2; 370/311, 278
See application file for complete search history.

(56) References Cited

U.S. PATENT DOCUMENTS

| 5,889,474 | A | * | 3/1999 | LaDue | 340/825.49 |
| 6,078,251 | A | * | 6/2000 | Landt et al. | 340/10.41 |
| 6,219,696 | B1 | | 4/2001 | Wynblatt et al. | 709/218 |
| 6,311,214 | B1 | | 10/2001 | Rhoads | 709/217 |
| 6,542,933 | B1 | | 4/2003 | Durst, Jr. et al. | 709/229 |
| 6,766,947 | B1 | | 7/2004 | Wan et al. | 235/383 |
| 6,978,118 | B1 | * | 12/2005 | Vesikivi et al. | 455/41.1 |
| 7,023,810 | B1 | * | 4/2006 | Moon | 370/252 |
| 2003/0120745 | A1 | | 6/2003 | Katagishi et al. | |
| 2004/0145472 | A1 | | 7/2004 | Schmidtberg et al. | |
| 2004/0145474 | A1 | | 7/2004 | Schmidtberg et al. | |
| 2004/0155106 | A1 | | 8/2004 | Schmidtberg et al. | |
| 2005/0140457 | A1 | | 6/2005 | Bellantoni | |
| 2005/0149564 | A1 | | 7/2005 | Jain et al. | |

FOREIGN PATENT DOCUMENTS

| WO | WO 01/73687 A2 | 10/2001 |
| WO | WO 01/80146 | 10/2001 |
| WO | WO 2004/003801 A1 | 1/2004 |
| WO | WO 2004/049750 A1 | 6/2004 |

OTHER PUBLICATIONS

International Search Report for PCT/IB2005/003164.

* cited by examiner

*Primary Examiner*—Van T. Trieu
(74) *Attorney, Agent, or Firm*—Alston & Bird LLP

(57) ABSTRACT

Systems, devices and methods for providing dynamic tailored product information to mobile terminals as a result of reading short-range wireless communication tags, such as RFID tags. The invention is able to provide consumer related product information to consumer operated terminals and retailer related product information to retailer or employee operated terminals, without requiring separate transponders or unique reading devices. In addition, the invention is able to accomplish providing dynamic information in a highly efficient and user-friendly manner and without requiring additional memory at the tag level.

34 Claims, 8 Drawing Sheets

METHODS, SYSTEMS, DEVICES AND COMPUTER PROGRAM PRODUCTS FOR PROVIDING DYNAMIC PRODUCT INFORMATION IN SHORT-RANGE COMMUNICATION

FIELD OF THE INVENTION

The present invention relates to short-range communication transponders and, more specifically to methods, devices, systems and computer program that provide dynamic, user-tailored product information in short-range communication mediums, such as Radio Frequency Identification (RFID) communication.

BACKGROUND OF THE INVENTION

Short-range wireless communication capability is becoming more prominent in a wide variety of mobile digital devices, such as cellular phones, personal digital assistants, pagers and other mobile devices. By equipping such devices with requisite short-range communication readers the devices have the ability to communicate via RFID, Bluetooth, infrared or other types of short-range communication dependent upon the type of reader/transceiver associated with the mobile device. Devices equipped with such readers are capable of receiving information from transponders, also referred as tags. As more and more portable digital devices become equipped with short-range wireless communication means, such as RFID and the like, the device's ability to access information and services expands.

Short-range communication tags are typically simplistic in design; including an integrated circuit that incorporates the associated short-range communication circuitry and sufficient memory to store the information that will be communicated to the transponder. As such, tags are typically contained within relatively compact packages, such as embedded within a credit-card type package, a key fob or the like. The compact nature of the tags makes them highly portable and adaptable to many different applications. However, the compact nature of the tag tends to limit the size of the memory unit and, thus, the amount of information that can be stored and transmitted by the tag is limited. Typically, current tags are limited to a memory size in the range of about 32 bytes to about 128 bytes of storage space. However, it is noted that next-generation tags may have upwards of 1000–3000 kilobytes or more of storage capacity. In addition to physical constraints, tags are typically high-volume, low cost devices that are generally disposable. Thus, even though the physical size of the tag may allow for additional memory space, the cost related to adding additional memory is typically economically prohibitive.

To overcome memory limitations, recent developments in tag technology have provided for tag information to be read and for network communication to be activated in which the read tag information is communicated to a dedicated external server, such as a web-based server or the like. The dedicated server is then able to retrieve and provide the reading device, such as a mobile terminal, with supplemental information that is associated with the information stored on the tag. See for example U.S. patent application Ser. No. 10/775,450, entitled "Accessing Data in a Short-Range Wireless Communication Network", filed 10 Feb. 2004, in the name of inventor Nystrom and assigned to the same inventive entity, Nokia Corporation, as the present invention. In addition, see U.S. patent application Ser. No. 10/600, 011, entitled "System, apparatus, and method for effecting network connections via wireless devices using radio frequency identification", filed 19 Jun. 2003, in the name of inventors Byman-Kivivuori et al and assigned to the same inventive entity, Nokia Corporation, as the present invention. Both applications are herein incorporated by reference as if setforth fully herein.

However, in addition to memory limitations, the limited information that can be stored on a tag is static information and, as such, each reader is provided with the same information when the tag is read. In many instances, a need will exist to provide readers of tags with different information depending on who or what device is reading the tag. This is especially evident in the situation in which the tag information is related to a product.

The type of information that an individual will desire about a product will vary depending on if the individual is consumer or a retailer. For example, a consumer who is interested in purchasing a certain product has a desire in receiving general product-related information, such as, for example, manufacturer information, product specifications, consumer reports, pricing information and the like. The retailer (i.e., shop owner or employee) does not benefit from the information that would be provided to a consumer but, rather, has an interest in being provided other information, such as inventory related information, manufacturing data and/or date. In addition, the retailer may benefit from being provided an interface, e.g., web site or telephone number, for contacting a product supplier to re-order the product.

Currently, the consumer may be equipped with a conventional near-field communication reader (NFC) that allows for interaction with NFC-based RFID tags and the retailer, who is interested in receiving standardized product identifier information, such as Electronic Product Core (EPC) or Uniform Product Code (UPC) information, will require an alternate type reader to read and decode such information.

Thus a need exists to develop systems, devices and corresponding methods and computer programs for providing dynamic, tailored product information based on the current needs of the user of the reader device. In this regard, a single short-range communication tag would be capable of providing a consumer relevant product information while providing a retailer altogether different information relevant to a product retailer. In addition, a desire exists to combine standard tag information with standardized product identifiers, such as EPC or UPC identifiers, such that both forms of information can be captured and read by standard short-range communication readers and smooth adaptation of the information can be realized based on the current user needs.

BRIEF SUMMARY OF THE INVENTION

The present invention provides for methods, systems, devices and computer programs for providing dynamic tailored product information to short-range communication readers. In this regard, the present invention is able to provide consumer related product information to readers that have consumer users and retailer related product information to readers having retailer or employee users, without requiring separate transponders or unique reading devices. In addition, the invention is able to accomplish providing dynamic information in a highly efficient and user-friendly manner and without requiring additional memory at the tag level. The invention provides for standardized product identifiers, such as EPC or UPC codes to be presented as tag information, thereby combining such product identifying information with customary short-range communication information.

In one embodiment of the invention a method for providing dynamic product information to a terminal is defined. The method includes the steps of reading at least a portion of information communicated from a short-range communication tag, invoking a terminal application based on the information read from the tag, decoding, via the terminal application, the information communicated from the short-range communication tag, retrieving a network resource locator based on the decoded information and initiating communication with the network resource to retrieve terminal-specific product information. The selection of the terminal application, otherwise referred to herein as a midlet application, will define the type of product information that will be provided to the terminal.

The method may additionally include the steps of initiating communication with a networked node to retrieve the network resource locator, invoking, at the networked node, a node application that corresponds to the terminal application and provides for the retrieval of the network resource locator and communicating a retrieved network resource locator from the networked node to the terminal. In embodiments in which the terminal communicates with a network node, such as a dedicated server, the midlet application and the node application, otherwise referred to herein as the servlet application will uniquely correspond and interact with one another to provide the mobile terminal with the network resource that includes the dynamic tailored product information associated with the terminal.

The method may additionally include the step of determining a current context of the terminal prior to the step of invoking the terminal application. In such embodiments in which the current context of the terminal is determined, the context information is used, in addition to the read tag information, to select the appropriate midlet application.

In alternate embodiments of the method the step of reading at least a portion of information communicated from a short-range communication tag may involve reading only the necessary portion of the tag information prior to selecting the appropriate midlet application or, all of the tag information may be read prior to selecting the appropriate midlet application. In addition, the reading step may occur internally, within the mobile terminal or it may be occur at a peripheral device that is in communication with the terminal.

The invention also provides for an alternate method for providing dynamic product information to a mobile terminal. The method includes the steps of reading at least a portion of information communicated from a short-range communication tag to provide midlet application selection criteria, selecting a midlet application based on the information, reading a standardized product identifier from the short-range transponder communication and decoding, via the midlet application, the standardized product identifier. The method additionally includes the steps of initiating, via the midlet application, communication with a data source, selecting a corresponding servlet application at the data source in response to the initiation of communication, retrieving, via the servlet application, a network resource based on the decoded standardized product identifier, communicating the network resource to the midlet application and initiating communication with the network resource to retrieve mobile terminal-specific product information.

The step of reading at least a portion of information communicated from a short-range communication tag to provide midlet application selection criteria will typically involve reading the tag serial number or a tag content identifier. Such information will typically be decisive in determining which midlet application should be invoked by the terminal to provide tailored product information. The method may further include the step of determining a current context of the mobile terminal prior to selecting a midlet application. In such embodiments the context information, along with the portion of the tag information that has been read, will be used to select the appropriate midlet application.

The step of decoding, via the midlet application, the standardized product identifier will typically entail decoding the binary EPC or UPC in to a general uniform resource identifier (URI) format. The step of initiating, via the midlet application, communication with a data source will typically entail creating and sending a HyperText Transfer Protocol (HTTP) post query that includes the decoded standardized product identifier.

The steps preformed by the midlet application may be performed in separate threads, thus, allowing for the steps to be performed in parallel. Parallel or simultaneous processing is preferred as it provides for expediting the overall process of presenting the terminal with tailored product information. For example, the step of decoding the standardized product identifier and initiating communication with a data source may occur simultaneously in separate threads.

The step of retrieving, via the servlet application, a network resource based on the decoded standardized product identifier nay further entail making an Object Name Service (ONS) query to retrieve a network resource Uniform Resource Locator (URL).

The invention is also embodied in a system for providing dynamic product information to a mobile terminal. The system includes a short-range communication tag including a memory unit that stores at least two information fields, wherein one of the information fields includes a standardized product identifier. The system also includes a mobile terminal device having a processor that executes a midlet application that is selected based on reading at least a portion of the tag information. The selection of the midlet application defines the type of product information that will be provided to the mobile terminal. The system also includes a network node, such as a server that is in network communication with the mobile terminal and includes a processor that executes a servlet application. The servlet application is invoked by a corresponding midlet application to retrieve a network resource identifier associated with the midlet application and tailored to the mobile terminal.

The mobile terminal device may further include a context engine in communication with the processor that provides a current context of the mobile terminal device. In such embodiments, the current context of the mobile device and at least a portion of the tag information is the basis for selection of the midlet application.

An alternate system embodiment of the present invention is defined as including a short-range communication tag, such as an RFID tag that includes a memory unit that stores at least two information fields. One of the information fields includes a standardized product identifier. The system also includes a mobile terminal device that includes a processor that executes a midlet application for retrieving a network resource locator associated with the standardized product identifier and initiating communication with the network resource. The midlet application is selected based on reading at least a portion of the tag information. The mobile terminal device may additionally include a memory unit that stores a plurality of network resource locators and is accessed by the midlet application to retrieve the network resource locator associated with the standardized product identifier. The mobile terminal device may further include a context engine in communication with the processor that provides a current context of the mobile terminal device. In such embodiment, the current context of the mobile device and at least a portion of the tag information is the basis for selection of the midlet application.

Additionally, the invention is embodied in a midlet application for providing dynamic tailored product information to a mobile terminal based on short-range wireless communications. The application will have computer-readable program instructions. The computer-readable program instructions include first instructions for decoding a standardized product identifier that has been read from a short-range wireless communication, second instructions for retrieving a product-specific network resource locator based on the decoded standardized product identifier and third instructions for initiating communication with a product-specific network resource. The second instructions may further provide instructions for initiating communication with a network node for the purpose of retrieving a product-specific network resource locator and the third instructions may further provide instructions for retrieving, at the network node, the product-specific network resource locator and communicated the locator to the midlet application.

Thus, the present invention provides systems, devices and methods for providing dynamic tailored product information to short-range communication readers. In this regard, the present invention is able to provide consumer related product information to readers that have consumer users and retailer related product information to readers having retailer or employee users, without requiring separate transponders or unique reading devices. In addition, the invention is able to accomplish providing dynamic information in a highly efficient and user-friendly manner and without requiring additional memory at the tag level.

BRIEF DESCRIPTION OF THE DRAWINGS

Figure 1:
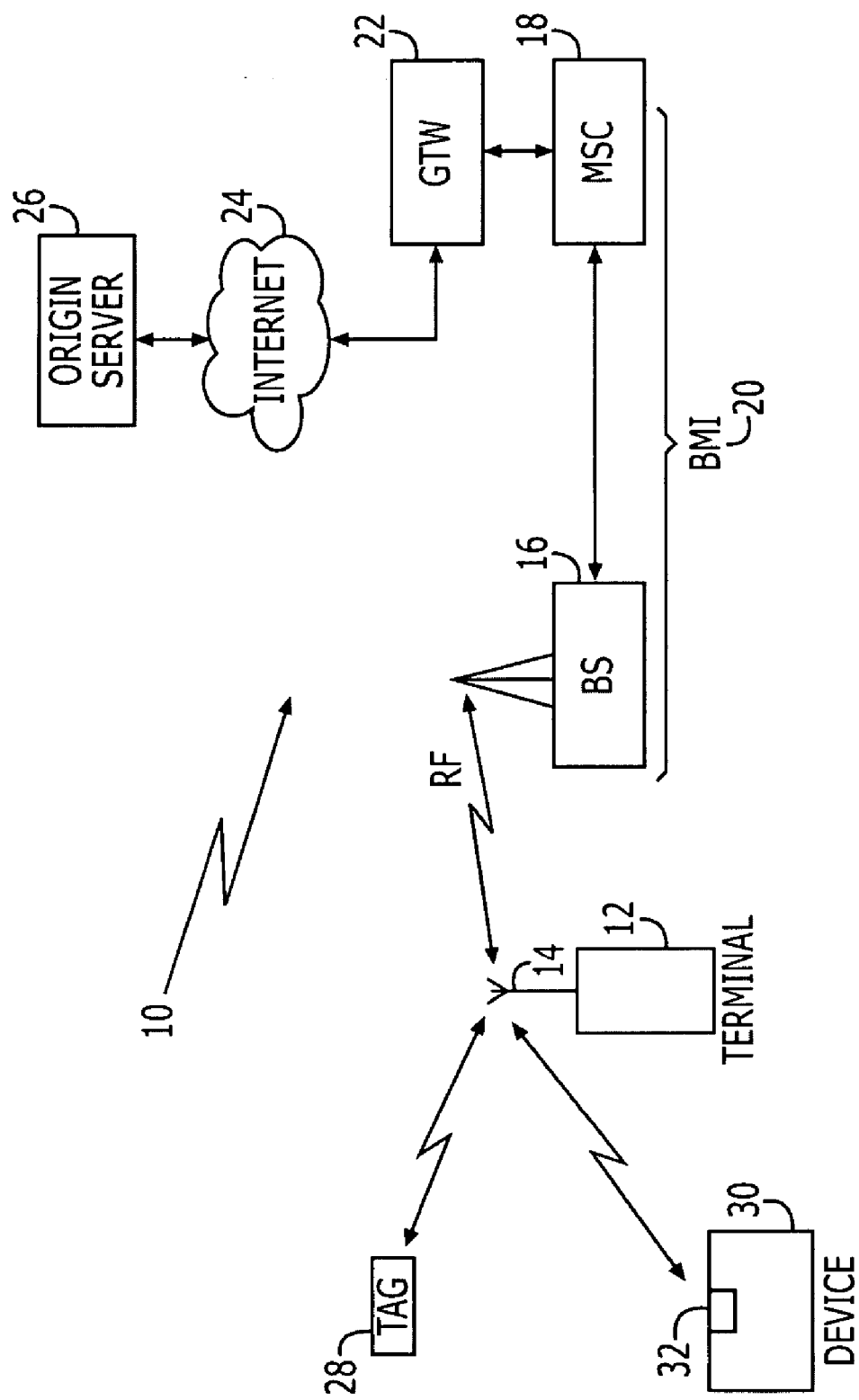

Having thus described the invention in general terms, reference will now be made to the accompanying drawings, which are not necessarily drawn to scale, and wherein:

FIG. 1 is a block diagram of a system wireless cellular network communication and short-range wireless communication, in accordance with the prior art . . .

Figure 2:
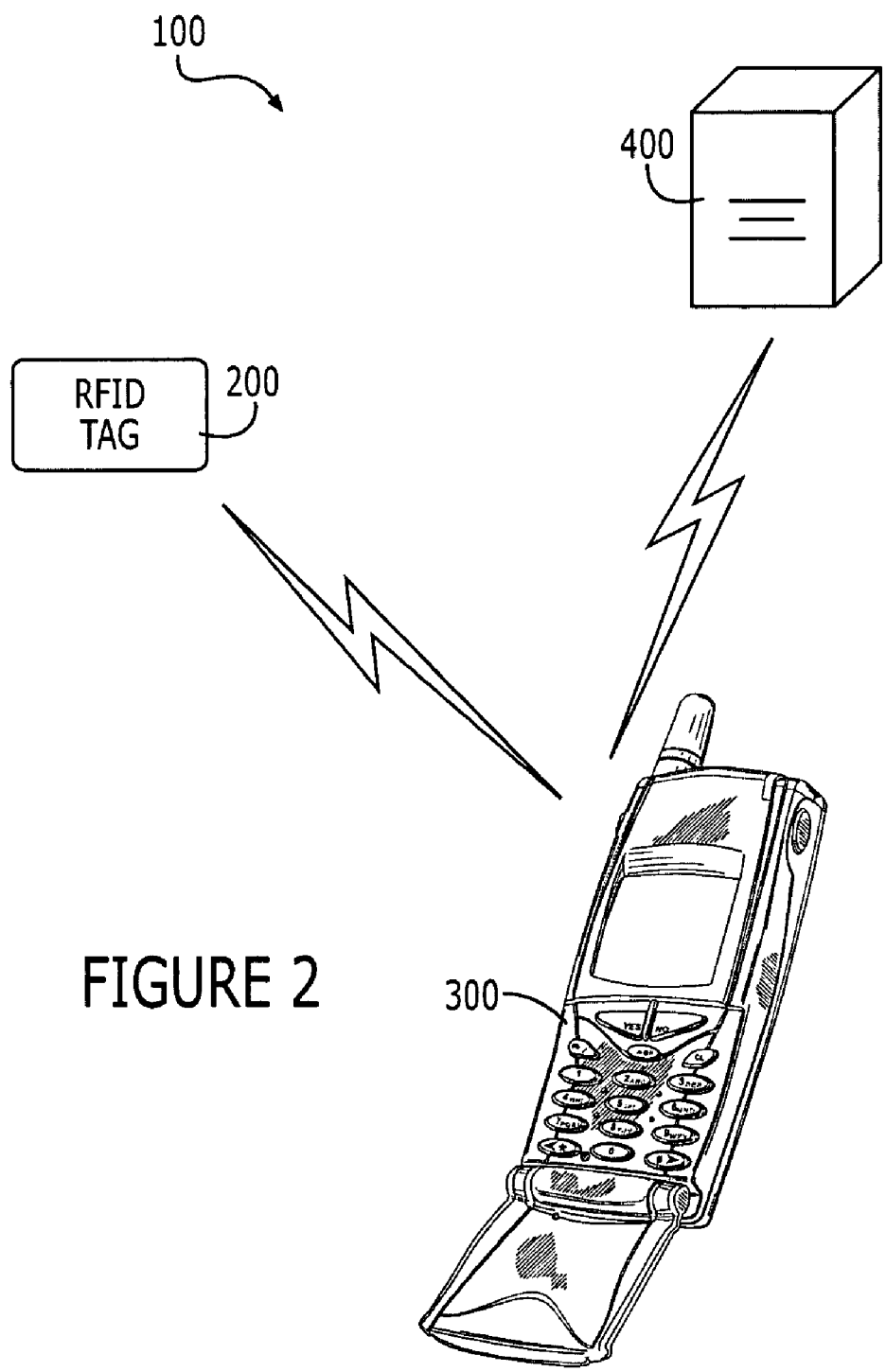

FIG. 2 is a simplified block diagram of a system for providing dynamic tailored product information to a mobile terminal, in accordance with an embodiment of the present invention.

Figure 3:
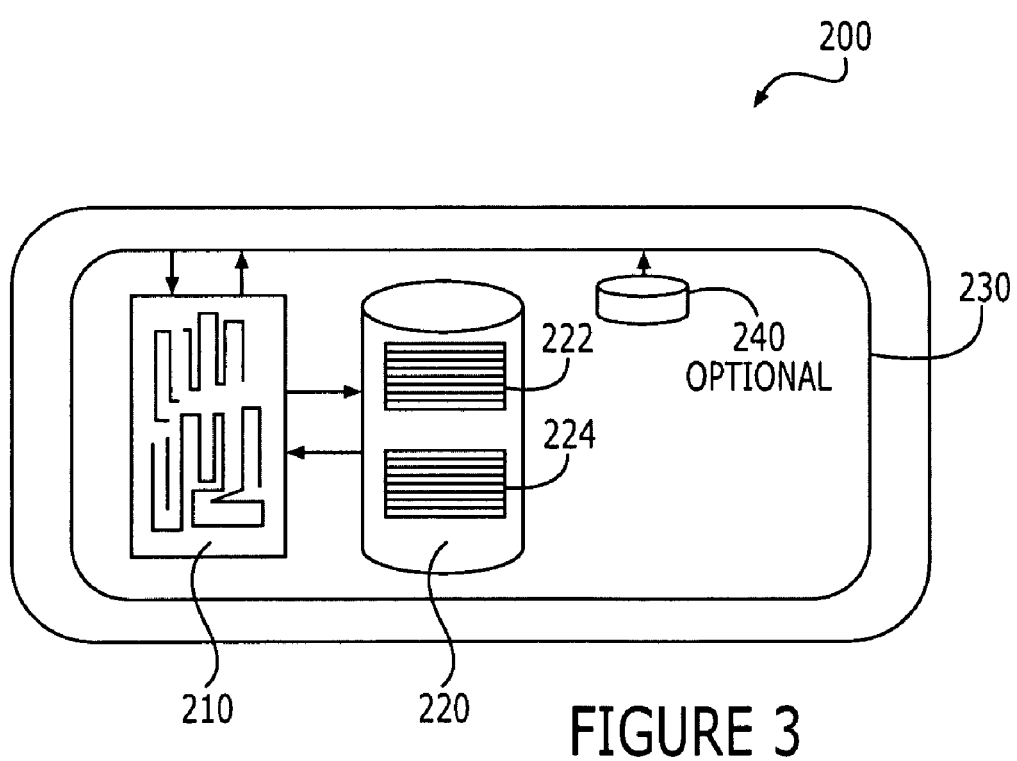

FIG. 3 is a block diagram of a short-range wireless communication transponder, otherwise referred to herein as a tag, in accordance with an embodiment of the present invention.

Figure 4:
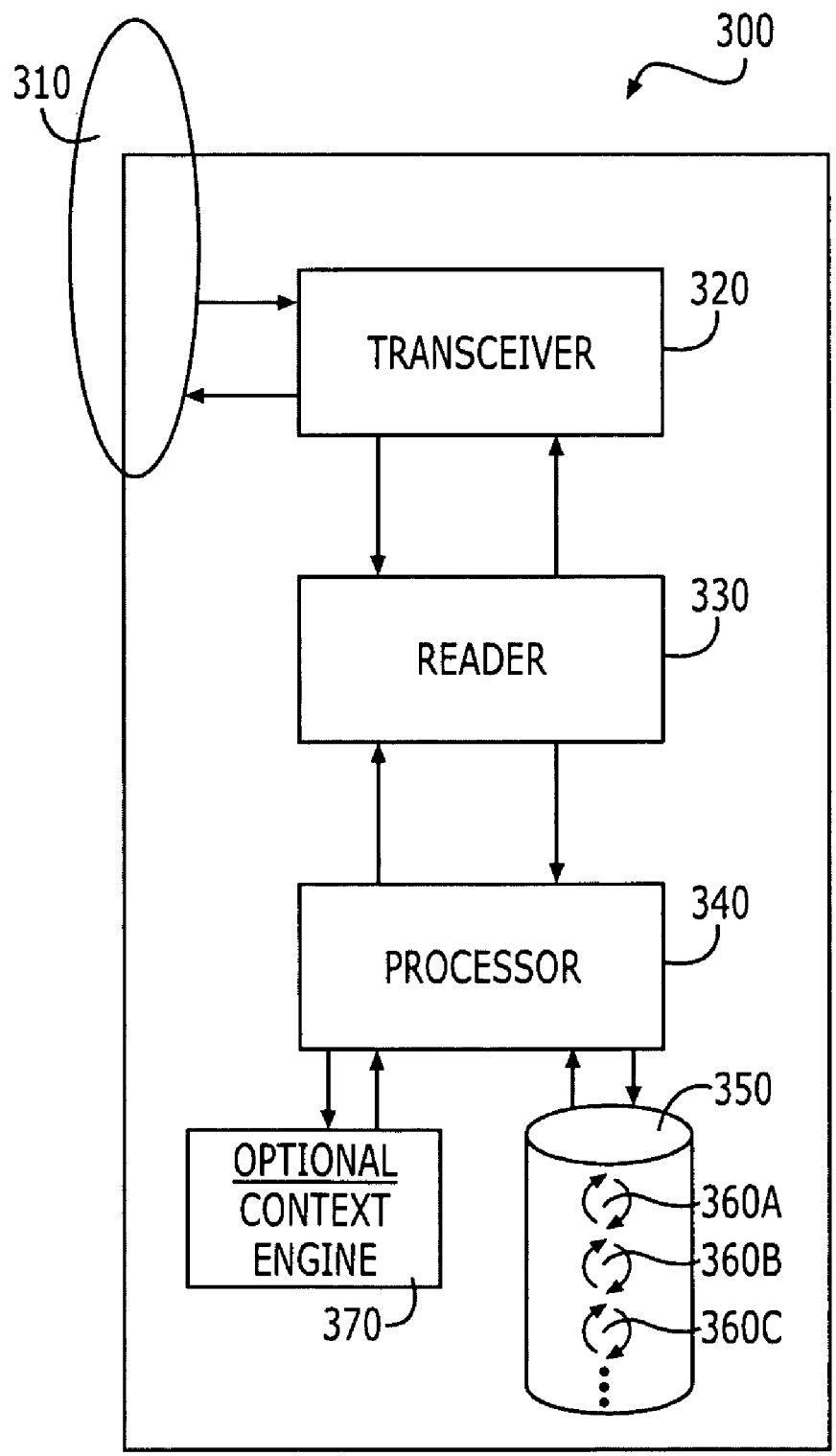

FIG. 4 is a block diagram of a mobile terminal having short-range wireless communication reading capability and the ability to provide dynamic tailored information from read communications, in accordance with an embodiment of the present invention.

Figure 5:
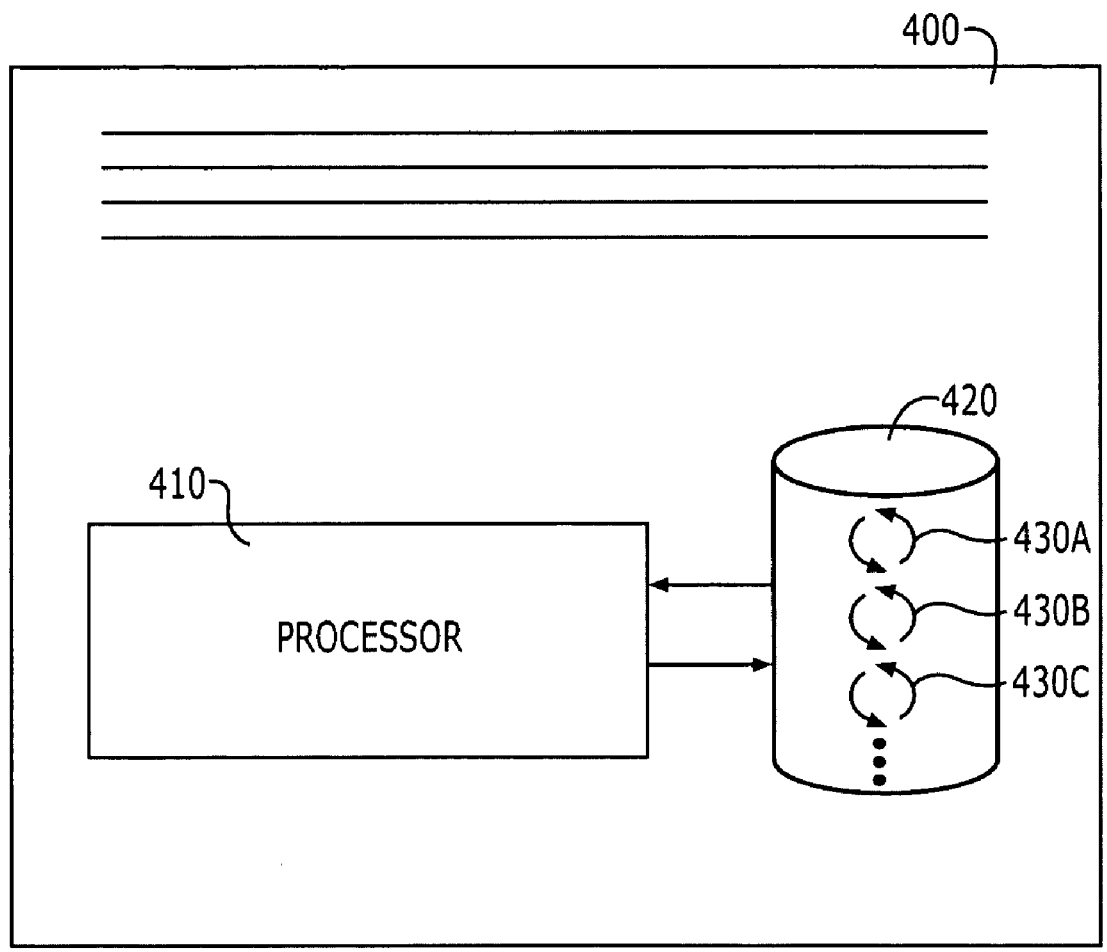

FIG. 5 is a block diagram of a network node, otherwise referred to herein as a dedicated server, which is implemented in the system for providing dynamic tailored product information to a mobile terminal, in accordance with an embodiment of the present invention.

Figure 6:
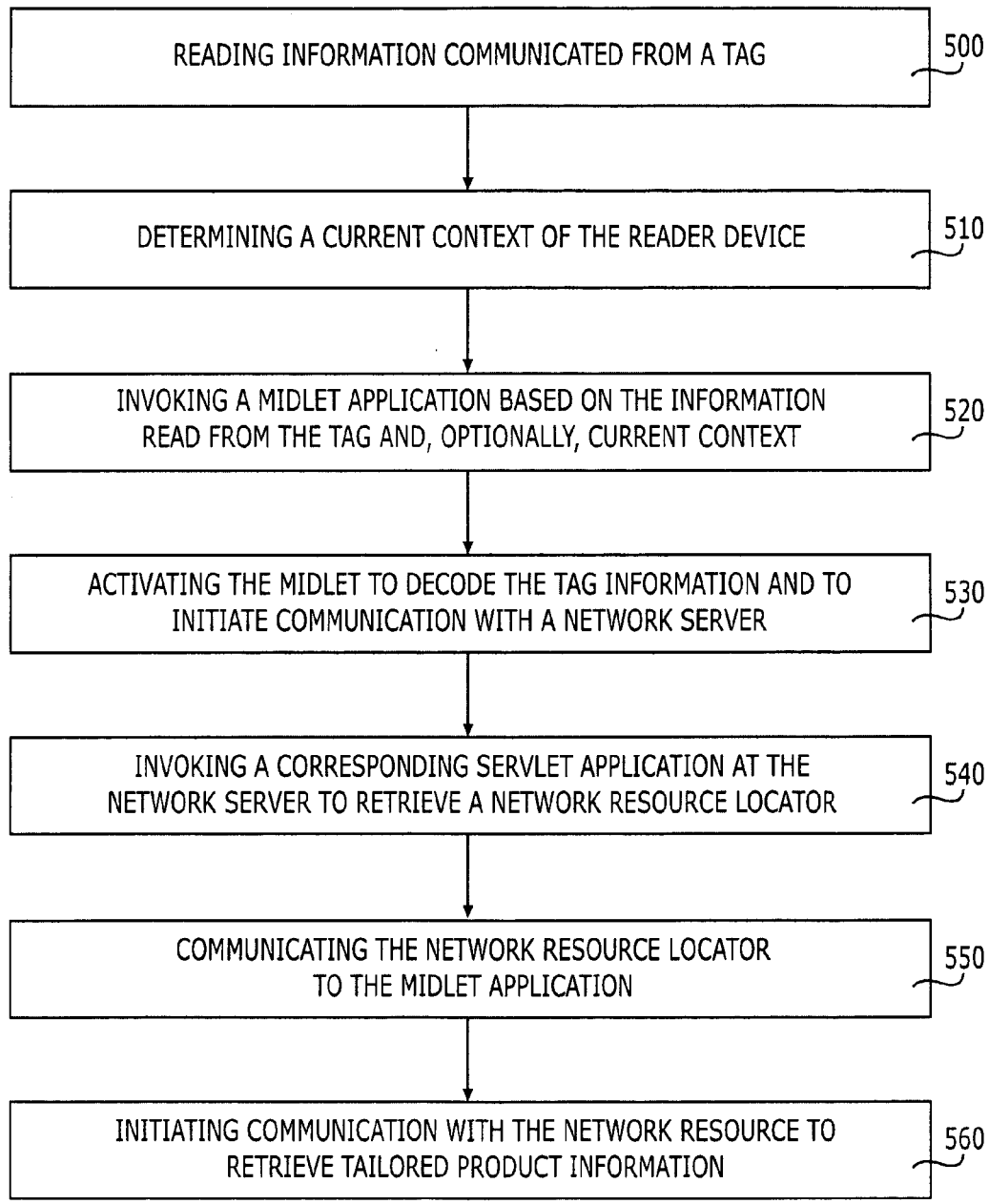

FIG. 6 is a flow diagram of a method for providing dynamic tailored product information to a mobile terminal via short-range wireless communication such as RFID, in accordance with an embodiment of the present invention.

Figure 7:
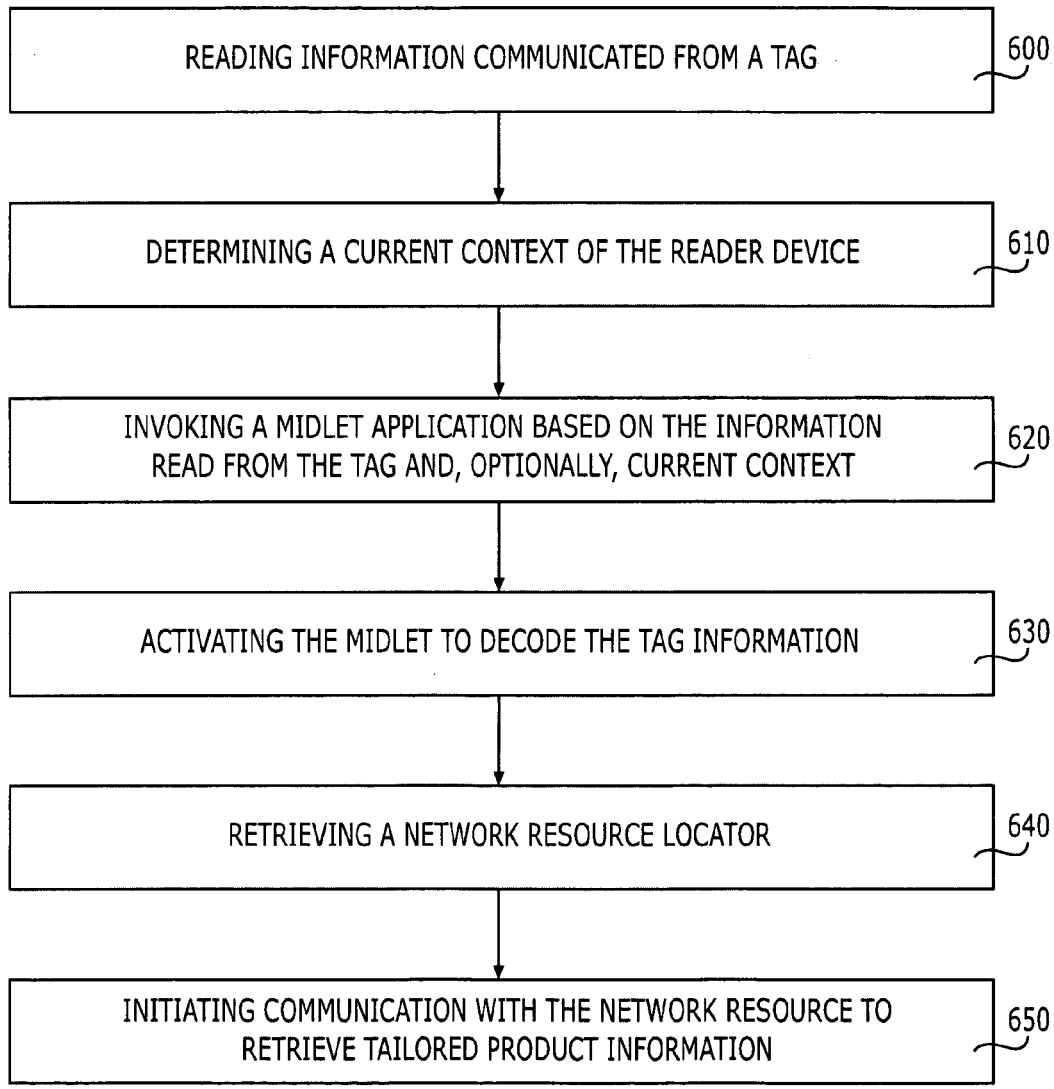

FIG. 7 is a flow diagram of an alternate method for providing dynamic, tailored product information to a terminal absent communication with an external server, in accordance with an embodiment of the present invention.

Figure 8:
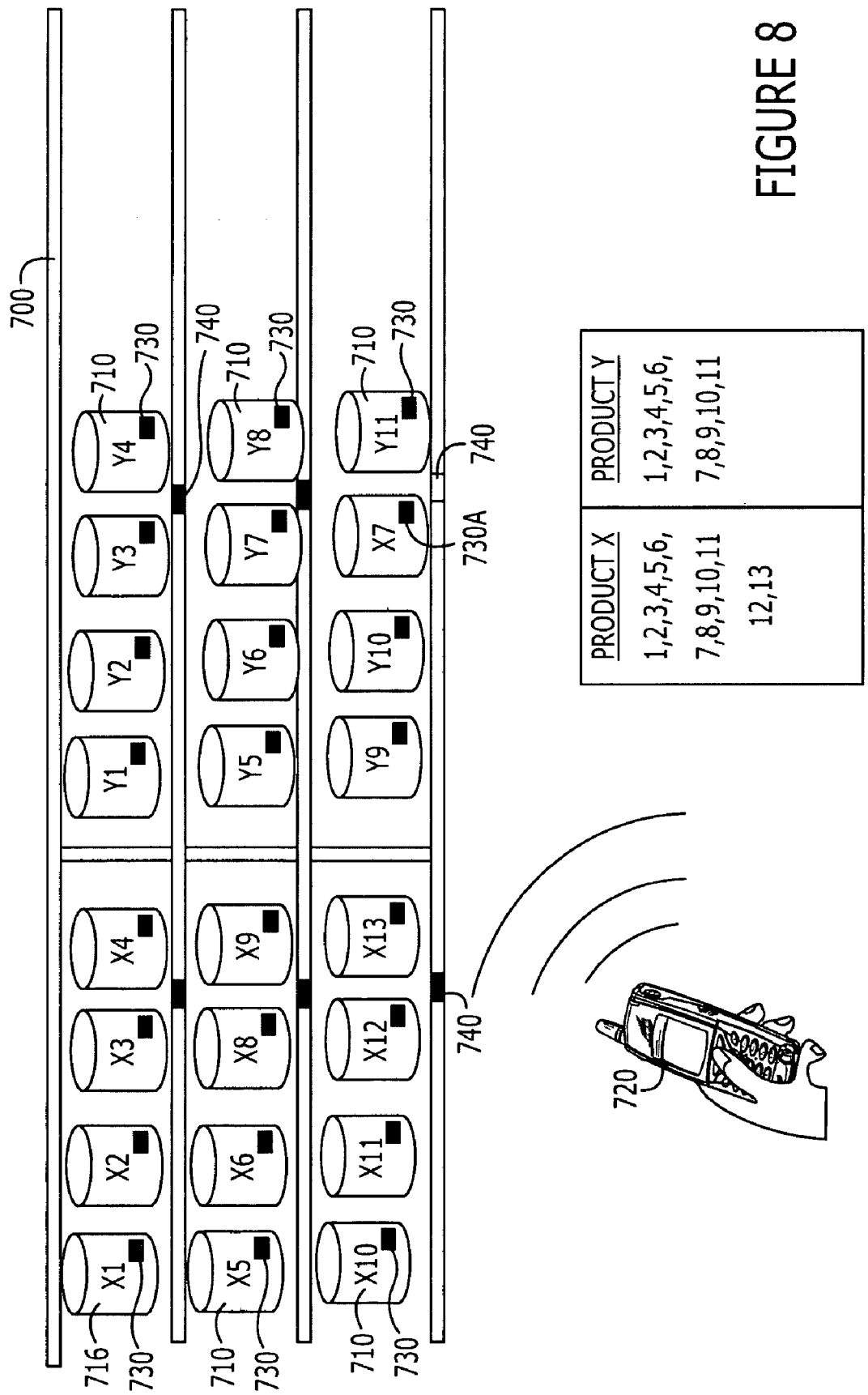

FIG. 8 depicts a block diagram of a system for providing dynamic tailored product information to a mobile terminal in an inventory environment, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods, systems, devices and computer program products for providing dynamic, user-tailored product information to short-range communication readers. In this regard, the present invention is able to provide consumer related product information to readers that have consumer users and retailer related product information to readers having retailer or employee users, without requiring separate transponders or unique reading devices. In brief, the present invention provides for short-range communication transponders, i.e., "tags" that benefit from having at least two information fields that can be used to tailor information based on user/reader preferences and needs. A standardized product identifier code, such as EPC or UPC code forms one information field of the tag and provides a standard interface for accessing detailed product information, along with uniquely identifying the product. The reader device, typically a mobile terminal device, is capable of reading a necessary portion of tag information and selecting a suitable midlet application for decoding and communicating with an external server. The external server executes a corresponding servlet application that retrieves information, typically in the form of a network resource, as dictated by the midlet application. Thus, selection of the midlet application, which is based on reading necessary tag information and, in some embodiment, current context of the reading device, and the subsequent interaction between the selected midlet application and the servlet application allows the terminal to receive tailored product information.

It should be noted that the terms midlet and servlet refer to applications that are executed on the terminal and the server, respectively. Midlet applications and servlet applications are considered generic terms that are not limited to any one specific computer programming implementation.

Referring to FIG. 1, a block diagram of a standard cellular network is shown, in which the mobile cellular devices have the additional ability to perform as readers of short-range wireless communications, such as Radio Frequency Identification Communications, in accordance with the prior art. The network 10 will include a terminal 12 (typically the network will include a plurality of terminals, although for the sake of clarity only one terminal is shown), which includes a network antenna 14 for transmitting signals to and for receiving signals from a base site or base station (BS) 16. The base station is a part of a cellular network that includes elements required to operate the network, such as a mobile switching center (MSC) 18. As is known by those of ordinary skill in the art of telecommunications, the cellular network may also be referred to as a Base Station, Mobile Switching Center and Interworking function (BMI) 20. In operation, the MSC is capable of routing calls and messages to and from the terminal when the terminal is making and receiving calls. The MSC also provides a connection to landline trunks when the terminal is involved in a call. Further, the MSC can, but need not, be coupled to a server GTW 22 (Gateway).

The MSC 18 can be coupled to a network, such as a local area network (LAN), a metropolitan area network (MAN), and/or a wide area network (WAN). The MSC can be coupled to the network directly, or if the system includes a GTW 22 (as shown), the MSC can be coupled to the network via the GTW. In one typical embodiment, for example, the MSC is coupled to the GTW, and the GTW is coupled to a WAN, such as the Internet 24. In turn, devices such as processing elements (e.g., personal computers, server computers or the like) can be coupled to the terminal 10 via the Internet. For example, the processing elements can include one or more processing elements associated with an origin server 26.

In addition to cellular network communication, the terminal 12 may be equipped to communicate with other devices via short-range communication techniques. In the FIG. 1 embodiment the terminal 12 communicates with transponder 28, i.e., tag and device 30 equipped with internal short-range transceiver 32 through a short-range interface. As will be appreciated, the electronic devices and tags can comprise any of a number of different known devices and tags capable of transmitting and/or receiving data in accordance with any of a number of different NFC techniques. For example, the NFC technique may include RFID, Bluetooth® (i.e., communication in the 2.4 GHz frequency band), infrared, IrDA (Infrared Data Association), UWB (Ultra Wideband) or the like. The electronic device 30 may include any of a number of different devices, including other mobile terminals, and wireless accessories, portable digital assistants (PDAs), pagers, laptop computers and other types of electronic systems. Likewise, for example, the transponders can comprise Radio Frequency Identification (RFID) tags or the like.

FIG. 2 provides a block diagram of a system for providing dynamic product information to a mobile device, in accordance with an embodiment of the present invention. The system 100 includes a short-range wireless transponder 200, such as an RFID tag, a mobile terminal device 300 that incorporates a short-range wireless reader or interrogator and a network node 400, such as a dedicated server that is in wireless communication with the mobile device. In an alternate embodiment of the system the functionality that is provided by the network node is provided by the mobile terminal, obviating the need to include the network node in the system.

FIG. 3 provides a block diagram of an example of a short-range wireless communication transponder, specifically a RFID tag 200, in accordance with an embodiment of the present invention. The RFID tag may be a Philips MIFARE® smart card tag, available from Royal Philips Electronics, the Netherlands or the RFID tag may be any other suitable tag.

In alternate embodiments of the invention the short-range communication transponder, also commonly referred to as a tag, may include, an Infrared (IR) transponder, a Bluetooth® (i.e., communication in the 2.4 GHz frequency range) or any other transponder that supports a specified frequency band suitable for short-range wireless communication. The RFID tag will include short-range wireless communication circuitry 210 and a memory unit 220 that is in communication with the circuitry. Typically, the short-range wireless communication circuitry and the memory unit will be configured in one unitary integrated circuit. In addition, the tag will typically include a coupling element or antenna 230 that serves to receive and transmit signals to a corresponding short-range wireless reader. In most applications the tag will be a passive device that relies on energy transferred from the reader to power the tag. Typically, passive tags are preferred so as to provide for low-cost devices. In other instances, the tag may be an active device that includes an internal power source, such as optional battery 240. The active and passive tags typically differ in the range of allowable data transmission. Typically, the passive tag is limited to operation in the range of about 3 meters, while the active tag may operate up to about 100 meters depending upon the strength of the internal power source. It is noted that in certain applications, a very short-range operation of the tag, in about the 10 centimeter range, is preferred.

The memory unit of the transponder is typically limited in storage capacity. In most passive transponder embodiments, the memory unit will provide for storage capacity in the range of about 32 bytes to about 128 bytes. Additionally, recent innovations have provided for "smart cards" that are characterized by memory in the range of about 1000 kilobytes to about 5000 kilobytes. As such the tag is limited in the amount of information that it can transmit to corresponding readers.

In accordance with the invention, the short-range wireless communication tag will include at least two separate information fields that are stored in the memory unit 220. A first information field 222 will include user data in the form of a standardized product identifier, such as an EPC code, a UPC code or the like. The standardized product identifier uniquely identifies the product or object corresponding to the tag. The product identifier will typically be a binary code in the standardized 96-bit or 128-bit character string arrangement. For example, a binary EPC code will include a string that includes a serial number field, a manufacturer number field and a product number field. A second information field 224 will include other information, such as a tag serial number or the like. Additional information fields, not shown in FIG. 2, may also be provided for and are within the inventive concepts herein disclosed. By providing for tags having two or more information fields the reading device can perform at least two separate operation flows depending on the current preferences of the reading device user.

FIG. 4 is a block diagram of a terminal 300 that incorporates a short-range wireless reader, also referred to as an interrogator, in accordance with an embodiment of the present invention. The terminal will typically be a mobile device, such as a cellular telephone, a PDA, a portable computing device, a digital camera or any other form of a mobile device. The mobile device will include antennae 310 for receiving and transmitting digital signals. In embodiments in which the reader is an RFID reader, the antennae will receive and transmit signals in the radio frequency range of wireless communication. Additionally, the mobile device will include a transceiver module 320 that is in communication with the antennae and provides demodulation of the signals received by the antennae and modulation of the signals that will be transmitted by the antennae. The mobile device will also include a reader 330 that is in communication with the transceiver module and performs decoding, i.e., logical interpretation, of the demodulated signal received from the transceiver. The reader is in communication with a processor 340 that generally operates under the control of computer program instructions stored in an associated memory device 350 in order to execute the instructions rendered from the logical interpretation of the signal by the reader. It should be obvious to those skilled in the art that in certain embodiment the transceiver function and the reader function may exist as modules executed within the processor and therefore distinct units that physically embody the transceiver or the reader are not required to practice the present invention.

Additionally, the mobile device 300 will typically include a User Interface (UI) (not shown in FIG. 4), such as a keypad, joystick/mouse or some other means for enabling user input. In addition, the mobile device may include a display (not shown in FIG. 4) and/or audio output means (not shown in FIG. 4) to provide audible information to the device user.

In the present invention, the reader is responsible for decoding, i.e., logically interpreting, the information transmitted from a corresponding transponder. Once the reader has read a necessary amount of information, for example the serial number of the tag, a content identifier of the tag or the like, the processor will select a suitable product code midlet application 360 to invoke from among one or more midlet applications that are stored in memory device 350. The selection of the suitable midlet application will be based on information that has been read from the tag and, in some embodiment of the invention, current context information provided to the processor by an optional context engine 370 that is in communication with the processor or context information may be provided by other devices, engines and/or modules within the terminal device. The selection of the midlet application will provide for tailored product information to be provided to the terminal based on the tag information and, in some instances, the contextual information supplied by the terminal.

The selected midlet application will provide for decoding the information in the first information field 222, the user data in the form of a standardized product identifier, such as EPC code or UPC code. In addition the selected midlet application will initiate communication with the network node 400, such as a dedicated network server. In one embodiment, initiation of the communication will be performed by creating and sending a HyperText Transfer Protocol (HTTP) post query along with the decoded standardized product identifier. It should be noted that the processes performed by the midlet application may occur on separate threads that are executed in parallel, thereby allowing for the decode operation to occur simultaneously while the communication with the server is being initiated; i.e., while the post query is being created.

In an alternate embodiment the mobile terminal will have access to internal network resource locators and, as such, the midlet application will not be required to initiate communication with an external network node, such as a dedicated server. In such embodiments the midlet application or another application executed at the terminal will retrieve, internally, the network resource locator, typically a Uniform Resource Locator (URL) based on the decoded standardized product code.

FIG. 5 is a block diagram of the network node 400, shown as a dedicated server device, in accordance with an embodiment of the present invention. The server will include a processor device 410 and associated memory unit 420. The memory unit will store multiple servlet applications 430 that each correspond to a specific midlet application. A corresponding servlet application will be invoked by the processor when the server receives the HTTP post query and decoded standardized product identifier from the corresponding midlet application. The servlet application is invoked to provide a retrieve and provide the terminal with the desired tailored product information. In one embodiment, the servlet application will provide an Object Name Service (ONS) query using the standardized product code in order to retrieve a network resource locator, such as a URL that is specific to the standardized product identifier. The servlet application will communicate the network resource locator to the midlet application of the terminal. As previously noted, in alternate embodiments the functionality provided by the dedicated server may reside in the mobile terminal, thereby, obviating the need to include the server within the method and system embodiments of the present invention.

Referring again to FIG. 4, once the midlet application 360 of the terminal device 300 receives the network resource locator from the servlet application 430 executed by the server 400, the midlet application will initiate communication with the network resource, typically by invoking a web browser and accessing the URL to receive the tailored product information.

FIG. 6 provides for a flow diagram of a method for providing dynamic product information to a terminal, in accordance with an embodiment of the present invention. At step 500, a reader will read at least a portion of the information associated with a tag, such as an RFID tag or the like. In some embodiments of the invention the reader will read only the "necessary" information prior to selecting a midlet application. The necessary information may include, but is not limited to, a tag identification number or serial number. By reading only the necessary portion of the tag needed to invoke a subsequent midlet application the overall process may be expedited because reading the entirety of the tag information may be time consuming endeavor. The reader will typically be physically embodied within the terminal device, although in alternate embodiments the reader may be a peripheral device that is detached but in communication with the terminal device. In embodiment in which only a necessary portion of the tag information is read prior to selecting a midlet application, the standardized product identifier code and associated attributes are read after the midlet application has been selected and invoked.

At optional step 510, the current context of the terminal is detected. The current context of the terminal may be the function for which the terminal and associated reader device are currently being used. For example, the terminal is being used by a consumer during a shopping experience or the terminal is being used by a retailer during an inventory assessment or the like. The current context of the terminal may be determined by a context engine or by the processor interfacing with other device hardware, applications or modules. In instances in which the method includes the determination of the current context, the resulting determination is used in selecting the appropriate midlet application.

At step 520, an appropriate midlet application is selected and invoked at the terminal. The terminal will typically store one or more midlet applications and the selection of which midlet application to invoke is based on the read tag information and, when applicable, the current context information associated with the terminal. Selection of which midlet application is to be invoked will dictate what product information is presented to the device. In this regard, selection of the appropriate midlet application provides tailored product information to the terminal. At step 530, the midlet application is activated to decode the tag information, specifically the standardized product identifier and to initiate communication with a dedicated network server. The standardized product identifier is decoded into a general Uniform Resource Identifier (URI) format, which typically includes an object identification number and a manager number. This information will subsequently be used at the dedicated server by the servlet application in retrieving the network resource locator. The initiation of communication with a dedicated server is typically accomplished by creating and communicating a HTTP post query including the decoded standardized product identifier. The decode process and the initiation of communication with the dedicated server may occur within separate threads to allow for parallel processing. In some embodiments, in which the General Packet Radio Service (GPRS) network or the like is used as the communication medium, the connection time may be significant and, therefore, simultaneous processing of the decode process and contacting the server expedites the overall tag reading and information display process.

At step 540, after the dedicated server has received, for example, the HTTP post query included the product identifier, a corresponding servlet application is invoked at the dedicated server. Each midlet application will have a corresponding servlet application that will be executed at the dedicated server. The servlet application is responsible for retrieving a network resource locator, such as a URL, based on the decoded standardized product identifier. In some embodiments of the invention retrieval of the network resource locator will be provided for by creating an Object Name Service (ONS) query in order to retrieve a Uniform Resource Locator (URL)

At step 550, the network resource locator will be communicated from the server to the midlet application of the terminal and, at step 560, the midlet application will be invoked to initiate communication with the network resource and retrieve the tailored product information. Typically, a browser application will be activate on a terminal display and the tailored product information will be retrieved from a network node and subsequently displayed on the terminal.

FIG. 7 provides a flow diagram of an alternate embodiment of the present invention, a method for providing dynamic, tailored product information to a terminal absent communication with an external server.

At step 600, a reader will read at least a portion of the information associated with a tag, such as an RFID tag or the like. The portion that will be read is typically the "necessary" portion that provides for applicable midlet application selection.

At optional step 610, the current context of the terminal is detected. The current context of the terminal may be determined by a context engine or by the processor interfacing with other device hardware, applications or modules. In instances in which the method includes the determination of the current context, the resulting determination is used in selecting the appropriate midlet application.

At step 620, an appropriate midlet application is selected and invoked at the terminal. The terminal will typically store one or more midlet applications and the selection of which midlet application to invoke is based on the read tag information and, when applicable, the current context information associated with the terminal. Selection of which midlet application is to be invoked will dictate what product information is presented to the device.

At step 630, the midlet application is activated to decode the tag information, specifically the standardized product identifier. The standardized product identifier is decoded into a general Uniform Resource Identifier (URI) format, which typically includes an object identification number and a manager number. This information will subsequently be used at the dedicated server by the servlet application in retrieving the network resource locator.

At step 640, the midlet application or another terminal application will be invoked to retrieving a network resource locator, such as a URL, based on the decoded standardized product identifier. In some embodiments of the invention retrieval of the network resource locator will be provided for by creating an Object Name Service (ONS) query in order to retrieve a Uniform Resource Locator (URL). The terminal will typically store the network resource locators locally or have access to externally stored network resource locators.

At step 650, the midlet application or another terminal application will be invoked to initiate communication with the network resource and retrieve the tailored product information. Typically, a browser application will be activated on a terminal display and the tailored product information will be retrieved from a network node and subsequently displayed on the terminal.

It will be understood that each block or step of the flowcharts in FIGS. 6 and 7, and combinations of blocks in the flowchart, can be implemented by computer program instructions. These computer program instructions may be loaded onto a computer or other programmable apparatus, such as the processor 340 of the mobile device 300 or the processor 410 of the server 400, to produce a machine, such that the instructions which execute on the computer or other programmable apparatus create means for implementing the functions specified in the flowchart block(s) or step(s). These computer program instructions may also be stored in a computer-readable memory 350 of the mobile device or memory 420 of the server that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block (s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Use Case—Inventory Control

According to one embodiment of the present invention, a system for providing dynamic product information to a mobile terminal in an inventory environment is provided. According to the depiction of FIG. 8 a storage unit 700 may include multiple products 710. The inventory is concerned with the total number of products. The mobile terminal device 720 that includes an RFID reader is equipped with an inventory midlet, which is capable of deducing the total number of products of a certain product type (X or Y) when scanning the storage unit environment. This function is made possible when the RFID reader recognizes product tags 730 with certain product codes, thus capable of counting the total number of products of that type. As noted, the system is also capable of properly counting a misplaced tag such as tag 730A.

Typically, the storage unit 700 is equipped with storage unit tags 740 that provide, for example, general product category information. As such, when the mobile terminal device 720 that includes an RFID reader scans the storage unit environment all tags, including the storage unit tags are read by the interrogating mobile terminal device. However, if the mobile terminal device is equipped with the proper inventory midlet, scanning of the storage unit tags results in reading only the product tags 730 and disregarding the storage unit tags. The storage unit tags are disregarded because they do not include the actual product information that is used by the midlet to provide the counting.

Thus, the present invention provides systems, devices and methods for providing dynamic tailored product information to short-range communication readers. In this regard, the present invention is able to provide consumer related product information to readers that have consumer users and retailer related product information to readers having retailer or employee users, without requiring separate transponders or unique reading devices. In addition, the invention is able to accomplish providing dynamic information in a highly efficient and user-friendly manner and without requiring additional memory at the tag level. The invention provides for standardizes product identifiers, such as EPC or UPC codes to be presented as tag information, thereby combining such product identifying information with customary short-range communication information.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing dynamic product information to a terminal, the method comprising:
   reading at least a portion of information communicated from a short-range communication tag;
   automatically selecting and invoking a terminal application based on the information read from the tag, wherein the terminal application defines the type of product information that will be provided to the terminal;
   decoding, via the terminal application, the information communicated from the short-range communication tag;
   retrieving a network resource locator based on the decoded information; and
   retrieving product information by initiating communication with the network resource.

2. The method of claim 1, further comprising initiating communication with a networked node to retrieve the network resource locator.

3. The method of claim 2, further comprising invoking, at the networked node, a node application that corresponds to the terminal application and provides for the retrieval of the network resource locator.

4. The method of claim 2, further comprising communicating a retrieved network resource locator from the networked node to the terminal.

5. The method of claim 1 further providing determining a current context of the terminal prior to invoking the terminal application.

6. The method of claim 1, wherein invoking a terminal application based on the information read from the tag further provides for invoking a terminal application based on the information read from the tag and the current context of the terminal.

7. The method of claim 1, wherein reading at least a portion of information communicated from a short-range communication tag further comprises reading all of the information communicated from the short-range communication tag.

8. The method of claim 1, wherein reading at least a portion of information communicated from a short-range communication tag further comprises reading, at a peripheral device, at least a portion of information communicated from a short-range communication tag and communicating the read information to the terminal.

9. A method for providing dynamic product information to a mobile terminal, the method comprising:
   reading at least a portion of information communicated from a short-range communication tag to provide midlet application selection criteria;
   automatically selecting a midlet application based on the information;
   reading a standardized product identifier from the short-range transponder communication;
   decoding, via the midlet application, the standardized product identifier;
   initiating, via the midlet application, communication with a data source, wherein the communication includes the decoded standardized product identifier;
   selecting a corresponding servlet application at the data source in response to the initiation of communication;
   retrieving, via the servlet application, a network resource based on the decoded standardized product identifier;
   communicating the network resource to the midlet application; and
   retrieving mobile terminal-specific product information by initiating communication with the network resource.

10. The method of claim 9, wherein reading at least a portion of information communicated from a short-range communication tag to provide midlet application selection criteria further comprises reading information chosen from the group consisting of a tag serial number and a tag content identifier.

11. The method of claim 9, further comprising determining a current context of the mobile terminal prior to selecting a midlet application.

12. The method of claim 11, wherein selecting a midlet application based on the information further comprises selecting a midlet application based on the information and the current context of the mobile terminal.

13. The method of claim 9, wherein reading at least a portion of information communicated from a short-range communication tag to provide midlet application selection criteria further comprises reading all of the information communicated from the short-range communication tag to provide midlet application selection criteria.

14. The method of claim 9, wherein reading at least a portion of information communicated from a short-range communication tag to provide midlet application selection criteria is further defined as being performed at a peripheral device that is in communication with the mobile terminal.

15. The method of claim 9, wherein reading a standardized product identifier from the short-range transponder communication further comprises reading a standardized product identifier chosen from the group consisting of a Electronic Product Code (EPC) and a Uniform Product Code (UPC).

16. The method of claim 9, wherein decoding, via the midlet application, the standardized product identifier further comprises decoding, via the midlet application, the standardized product identifier in to a general uniform resource identifier (URI) format.

17. The method of claim 9, wherein initiating, via the midlet application, communication with a data source further comprises sending a HyperText Transfer Protocol (HTTP) post query including the decoded standardized product identifier to the data source.

18. The method of claim 9, wherein decoding, via the midlet application, the standardized product identifier and initiating, via the midlet application, communication with a data source occur simultaneously.

19. The method of claim 9, wherein selecting a corresponding servlet application at the data source in response to the initiation of communication by the midlet application further comprises selecting a corresponding servlet application at the data source in response to the receipt of a HyperText Transfer Protocol (HTTP) post query including the decoded standardized product identifier.

20. The method of claim 9, wherein retrieving, via the servlet application, a network resource based on the decoded standardized product identifier further comprises making an Object Name Service (ONS) query to retrieve a network resource Uniform Resource Locator (URL).

21. The method of claim 9, wherein initiating communication with the network resource to retrieve terminal-specific product information further comprises invoking a terminal browser application to retrieve terminal-specific product information.

22. A system for providing dynamic product information to a mobile terminal, the system comprising:
a short-range communication tag including a memory unit that stores at least two information fields, wherein one of the information fields includes a standardized product identifier;
a mobile terminal device that includes,
a processor that executes one of one or more midlet applications that is automatically selected based on reading at least a portion of the tag information, wherein the selection of the midlet application defines the type of product information that will provided to the mobile terminal; and
a network node in communication with the mobile terminal and includes,
a processor that executes one of one or more servlet applications, wherein a servlet application is invoked by a corresponding midlet application to retrieve a network resource identifier associated with the midlet application and tailored to the mobile terminal.

23. The system of claim 22, wherein the mobile terminal device further comprises a context engine in communication with the processor that provides a current context of the mobile terminal device, wherein the current context of the mobile device and at least a portion of the tag information is the basis for selection of the midlet application.

24. A system for providing dynamic product information to a mobile terminal, the system comprising:
a short-range communication tag including a memory unit that stores at least two information fields, wherein one of the information fields includes a standardized product identifier; and
a mobile terminal device that includes,
a processor that executes one of one or more midlet applications for retrieving a network resource locator associated with the standardized product identifier and initiating communication with the network resource, wherein the midlet application is automatically selected based on reading at least a portion of the tag information.

25. The system of claim 24, wherein the mobile terminal further includes a memory unit that stores a plurality of network resource locators.

26. The system of claim 24, wherein the mobile terminal device further includes a context engine in communication with the processor that provides a current context of the mobile terminal device, wherein the current context of the mobile device and at least a portion of the tag information is the basis for selection of the midlet application.

27. A midlet application for providing dynamic tailored product information to a mobile terminal based on short-range wireless communications, the application having computer-readable program instructions, the computer readable program instructions comprising:
first instructions for decoding a standardized product identifier that has been read from a short-range wireless communication with a short-range communication tag;
second instructions for retrieving a product-specific network resource locator based on the decoded standardized product identifier; and
third instructions for initiating communication with a product-specific network resource,
wherein the midlet application is automatically selected based on reading at least a portion of the tag information.

28. The midlet application of claim 27, wherein the first instructions of the computer-readable program instructions further defines the standardized product identifier as chosen from the group consisting of an Electronic Product Code (EPC) and a Uniform Product Code (UPC).

29. The midlet application of claim 28, wherein the second instructions for retrieving a product-specific network resource locator based on the decoded standardized product identifier further comprises instructions for initiating communication with a network node for the purpose of retrieving a product-specific network resource locator, wherein the communication includes the decoded standardized product identifier.

30. The midlet application of claim 29, wherein the second instructions for initiating communication with a network node for the purpose of retrieving a product-specific network resource locator further includes instructions for creating a HyperText Transfer Protocol (HTTP) post query.

31. The midlet application of claim 29, wherein the third instructions for initiating communication with a product-specific network resource is based on the network node retrieving and communicating the product-specific network resource locator to the midlet application.

32. A mobile terminal device, the device comprising:
a memory unit that stores one or more midlet applications;

a processor in communication with the memory unit that automatically selects one of the midlet applications based on information read from a short-range wireless communication, wherein the selection of the midlet application defines the type of short-range wireless communication information that will be presented to the mobile terminal.

33. The mobile terminal device of claim 32, further comprising a context engine in communication with the processor that provides the processor with current context information of the mobile terminal, wherein the processor selects the midlet application based on the current context information and on the information read from a short-range wireless communication.

34. The mobile terminal device of claim 32, further comprising a short-range wireless communication reader in communication with the process that provides for reading of short-range wireless communications communicated from a short-range wireless communication transponder.

* * * * *